(12) United States Patent
Aksyuk et al.

(10) Patent No.: US 6,205,267 B1
(45) Date of Patent: Mar. 20, 2001

(54) OPTICAL SWITCH

(75) Inventors: Vladimir J. Aksyuk, Piscataway; Bradley P. Barber, Chatham; David J. Bishop, Summit; Clinton R. Giles, Whippany; Lawrence W. Stulz, Shark River Hills; Rene R. Ruel, Bridgewater, all of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/197,317

(22) Filed: Nov. 20, 1998

(51) Int. Cl.$^7$ .................................................. G02B 6/26
(52) U.S. Cl. .......................... 385/19; 385/15; 385/16; 385/18
(58) Field of Search ................................ 385/15, 16, 18, 385/19, 25, 27, 52, 76, 77

(56) References Cited

U.S. PATENT DOCUMENTS

| | | | |
|---|---|---|---|
| 4,674,831 | * 6/1987 | Bagby | 385/19 |
| 4,836,636 | * 6/1989 | Obara et al. | 385/19 |
| 5,016,978 | * 5/1991 | Fargette et al. | 385/19 X |
| 5,175,780 | * 12/1992 | Sano et al. | 385/47 |
| 5,226,099 | * 7/1993 | Mignardi et al. | 385/19 |
| 5,408,550 | * 4/1995 | Lefevre et al. | 385/18 |
| 5,594,820 | * 1/1997 | Garel-Jones et al. | 385/22 |
| 5,923,798 | * 7/1999 | Aksyuk et al. | 385/19 |

* cited by examiner

*Primary Examiner*—Brian Healy

(57) ABSTRACT

An optical switch uses a MEMS device to insert a highly reflective shutter in a gap between a pair of coaxially aligned fibers. When the switch is closed, an input optical signal passes with little loss through the gap. When the switch is open and the shutter is positioned in the gap, an input optical signal incident on the shutter is reflected back into the input fiber. Such light is diverted by an optical circulator into a new path.

17 Claims, 2 Drawing Sheets

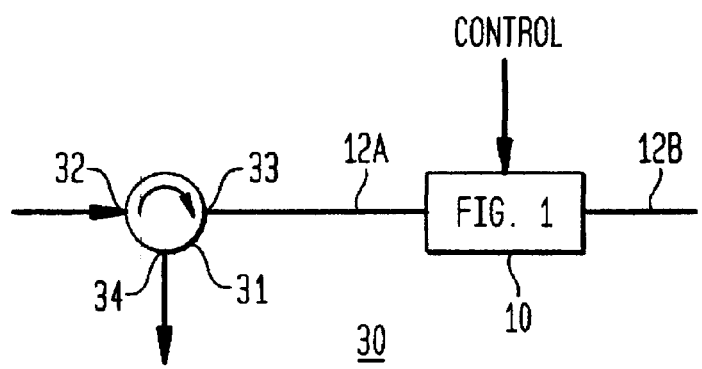
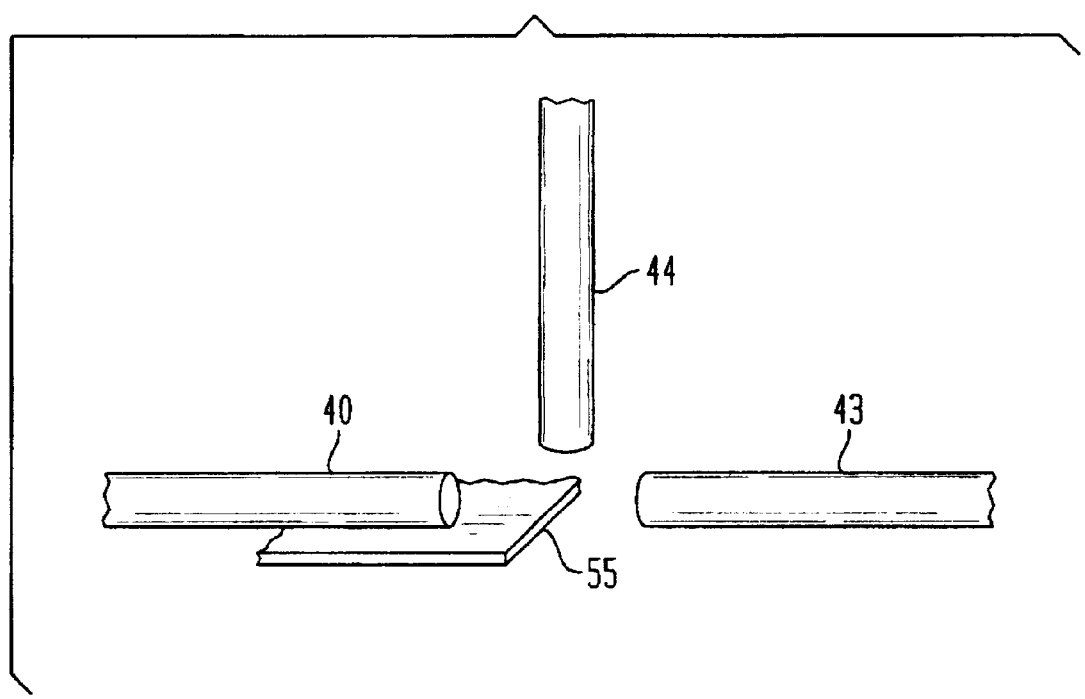

OPTICAL SWITCH

FIELD OF THE INVENTION

This invention relates to an optical switch that employs a micro-electro-mechanical system (MEMS) device to do optical switching.

BACKGROUND OF THE INVENTION

MEMS is a technology that exploits lithographic mass fabrication techniques of the kind that are used by the semiconductor industry in the manufacture of silicon integrated circuits. Generally the technology involves shaping a multilayer structure by sequentially depositing and shaping layers of a multilayer wafer that typically includes a plurality of polysilicon layers that are separated by layers of silicon oxide and silicon nitride. The shaping of individual layers is generally done by etching and the etching is generally controlled by masks that are patterned by photolithographic techniques. The technology also may involve the etching of intermediate sacrificial layers of the wafer to release overlying layers for use as thin elements that can be easily deformed or moved.

The technology has proven highly versatile and has been used to form a wide variety of miniature devices varying in size from millimeters to microns. MEMS technology is discussed in a paper entitled "MEMS The Word for Optical Beam Manipulation" published in *Circuits and Devices,* July 1997, pp. 11–18.

MEMS devices can be fabricated by the MCNC MEMS Technology Application Center, Research Triangle Park, N.C. 27709. The technology is described in "Multiuser MEMS Processes (MUMPS) Introduction and Design Rules," Rev. 4, Jul. 15, 1996 MCNC Mems Technology Applications Center, Research Triangle Park, N.C. 27709 by D. Keoster, R. Majedevan, A. Shishkoff, and K. Marcus.

Optical systems are becoming of increasing importance and optical switches have vital roles in many optical systems, particularly in optical networks that require rapid and flexible reconfiguration. Examples of such roles include protection switching of optical transmission links and the reconfiguration of optical cross-connects and add/drop modules (ADM) for wavelength division multiplexed (WDM) systems. There has been demonstrated a wide variety of optical switches even including several MEMS optical switches. Despite this wide variety, none has provided the combination of high optical performance, ultracompact size, low actuation voltage, and ultra-low power consumption with the potential of easy fabrication, low cost and suitability for use both in demanding gigabit optical networks and in cost-sensitive applications, such as fiber-to-the-home.

The present invention seeks to provide optical apparatus that helps satisfy this need.

SUMMARY OF THE INVENTION

The invention is an optical switch that uses an element of a MEMS device to interpose controllably a shutter in a gap between a pair of optical waveguides, for example optical fibers that are aligned end-to-end. When the shutter is not interposed between the two fiber ends defining the gap, an optical signal launched in the source or input fiber of the pair travels with little loss or disturbance across the gap and continues along the output fiber. When the shutter is interposed, the optical signal is switched.

As an illustrative embodiment, a switch in accordance with the invention comprises a pair of optical waveguides, typically optical fibers that are aligned end-to-end with a small gap between adjacent ends. In one form of switch, a three-port optical circulator is included at the input of the switch. An input signal is applied to the first port of the circulator, exits at the second port, and enters the input end of the source fiber of the pair. In the state when the shutter is out of the gap, as discussed, the optical signal passes through and exits from the output fiber with little loss. In the state when the shutter is in the gap, the incident optical signal exiting from the source fiber into the gap is reflected back into the source fiber and into the second port of the optical circulator for exit at its third port for travel in a new path. In another form of switch, in place of the optical circulator, there may be included a directional coupler coupled to the source fiber that extracts the reflected wave for travel in a different path.

In another form of switch, the shutter may be introduced in a fashion to deflect the optical signal selectively into one of two new paths.

The position of the shutter, in or out of the gap, is determined by a voltage controlled actuator that comprises a pair of conductive plates formed by a pair of spaced apart polysilicon layers in a structure that was processed by MEMS technology. The control voltage serves to move the upper of the two plates which is essentially a flexible layer suspended over the lower of the two plates. The downward movement of the upper plate is made to swing upwards the one end of a lever of which the other end is coupled by way of a flexible section with the upper plate. A shutter that is positioned at the one end of the lever arm is then interposed in the gap formed between the adjacent ends of a pair of aligned waveguides, for example optical fibers. The shutter is coated to be highly reflective of incident optical signals and each adjacent end of the two fibers is anti-reflection (AR) coated. As a result, when the shutter is in the gap, essentially all of the input optical signal is reflected back into the input fiber and essentially none reaches the output fiber. Moreover, the reflected signal passes through an optical circulator that diverts such a backward traveling signal and sends the optical signal along a new path distinct from the one it would have traveled had it not been reflected by the shutter.

A feature of a particularly attractive form of the MEMS device uses a lever arm that includes a flexible section that is integral with the upper plate and that permits essentially frictionless movement of the shutter into the gap between the fibers.

Another embodiment to be described permits light from a source fiber to be switched or divided between a pair of output fibers.

The invention will be better understood from the following more detailed description taken in conjunction with the accompanying drawing.

BRIEF DESCRIPTION OF THE DRAWING

FIG. 3 is a circuit schematic illustrative of the way in which the optical switch of FIG. 1 would be used.

FIG. 5 illustrates how a switch in accordance with the invention can be used to divert light from a source waveguide to either of two other waveguides.

Figure 1:
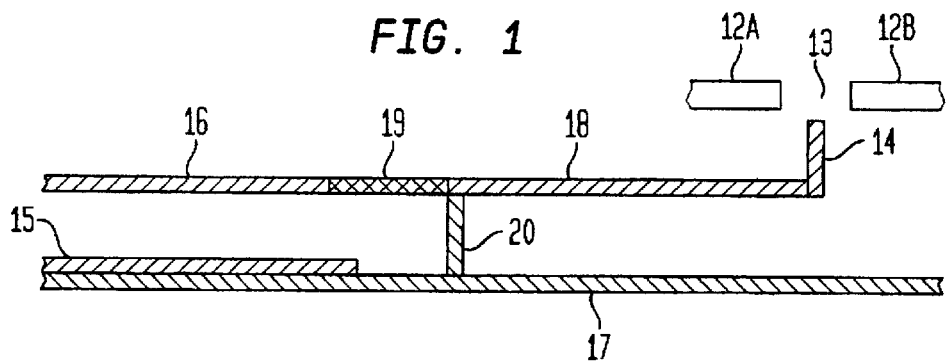
FIG. 1 is a schematic showing of one illustrative embodiment of an optical switch utilizing a MEMS device as the switching element in accordance with the invention.

It is to be noted that the drawing is not to scale.

DETAILED DESCRIPTION

Figure 4:
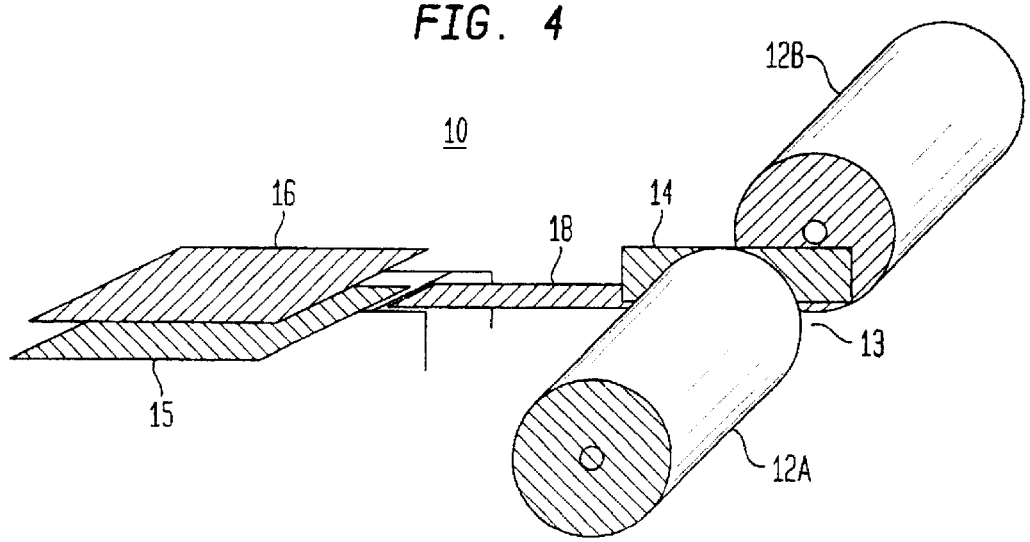
FIG. 4 is a perspective view of a portion of the MEMS of FIG. 1 when the shutter is at rest position in an arrangement different from that of FIG. 1.

With reference now to the schematic of FIG. 1, the optical switch 10 comprises a pair of optical fibers 12A, 12B that are coaxially aligned and spaced apart by a narrow gap 13, typically about 20 microns wide. In FIG. 4 there is shown a perspective view of a presently preferred orientation of the optical fibers in the optical switch 10. A typical high performance optical fiber comprises a core of relatively small diameter, typically between seven and ten microns, and a surrounding cladding typically of about 125 microns diameter. A shutter 14 aligned with the gap typically may have a height of about fifty microns and, in one possible mode of operation when in its rest position, is not interposed in the critical region of the gap between the two fibers. In one arrangement, the optical fibers and the MEMS element are both positioned on a common planar base of a package with the shutter edge between five and ten microns below the centers of the two fiber cones. In such a fiber, most of the energy of an optical signal is concentrated in the fiber core and the closely surrounding portion of the cladding. In particular, in a fiber having a core diameter of about eight microns and a cladding diameter of 125 microns, essentially all of the energy of an optical signal traveling in such a fiber is included in a central region of the fiber having a diameter of less than twenty microns. The position of the shutter 14 is controlled by an actuator that includes a pair of spaced plates 15, 16, of which lower plate 15 is rigid and upper plate 16 is a thin membrane movable under control of a voltage applied between the two plates. The upper plate 16 is supported on a substrate 17, typically of silicon over which lies a layer of silicon nitride (not shown separately). The upper plate 16 is connected to one end of lever 18 by way of a flexure section 19. The shutter 14 is connected to the other end of the lever 18. The assembly of plate 16, flexure section 19, lever 18 and the shutter 14 is supported above the substrate 17 by posts 20. In one mode of operation with zero voltage applied to the actuator, the shutter does not affect the critical gap region. When the shutter is activated by applying sufficient voltage to the actuator, it is moved to interrupt this critical region.

In another possible mode of operation, the shutter is already interposed in the critical region of the gap in the rest position, and when actuated the shutter is moved out of the critical region.

Figure 2:
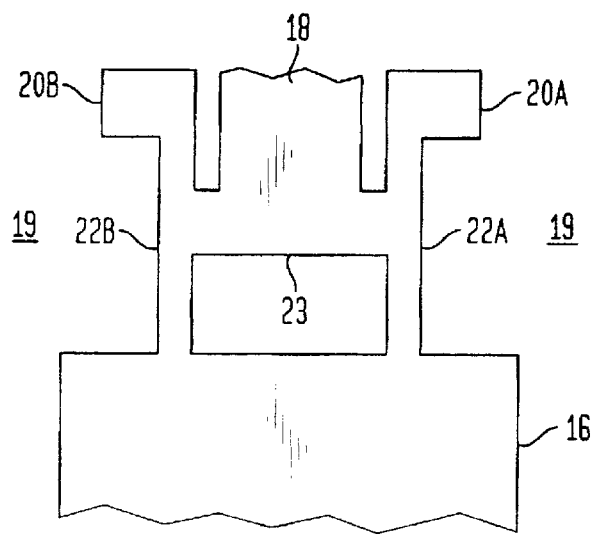
FIG. 2 is a top view of the flexible portion of the movable element of the MEMS device of FIG. 1.

The structure of the flexure section is best seen in FIG. 2. The flexure section 19 comprises a pair of arms 22A and 22B that are sufficiently narrow to be highly flexible and the bracing strip 23 therebetween that helps them to flex together. One end of each of arms 22A, 22B is integral with the movable plate 16 and the other end is integral with the posts 20A, 20B that extend to the substrate 17, as seen in FIG. 1. The posts 20A, 20B may have an enlarged area where they integrate with the flexible arms than their cross sections in the portion that extends to the substrate 17. The elements that form the movable shutter assembly are of polysilicon and their mass is sufficiently small and the polysilicon is sufficiently rigid that a pair of supports is generally adequate to keep this assembly appropriately suspended. If desired, an additional pair of support posts in parallel with the first can be provided with a separate flexure section.

The structure described was formed largely by the surface micromachining of sequentially deposited layers, many of polysilicon, in the manner characteristic of MEMS technology.

Advantageously, the shutter 14 was rotated 90 degrees to its operating vertical position upon release by a self-assembly mechanism to perform the rotation automatically upon release. The self-assembly mechanism uses energy stored in a high tensile residual stress metal layer to produce vertical motion, which is then used to rotate and lock the shutter in position, as is discussed in a paper entitled, "Low Insertion Loss Packaged and Fiber Connectorized Si Surface-Micromachined Reflective Optical Switch" that appeared in the Proceedings of Solid State Sensors and Actuators Workshop at Hilton Head Island, S.C. on Jun. 8, 1998 by the applicants of this same application and its teaching is incorporated herein by reference. This paper describes earlier embodiments of the MEMS device that can be similarly used. It is characteristic of this presently preferred embodiment that the movement of the shutter is essentially frictionless because it involves an absence of any rubbing parts.

To prevent the top plate 16 from touching the bottom plate 15 and shorting the capacitor formed by the two plates, spacers 28 shown in FIG. 1 can be provided protruding from the bottom surface of the top plate 16. Holes (not seen) can also be provided in the bottom plate 16 aligned with the spacers such that the spacers can pass through the holes to rest on the nitride layer underlying the bottom plate 16 without touching the plate itself if the applied voltage is sufficient.

The lever arm 18 typically may be about 500 microns long and capable of rotation around a pivot point to provide a desired mechanical advantage. The plate dimensions typically can range between 220×170 to 300×350 $\mu$m and a thickness of the plate of between about 1.5 $\mu$m to 3.5 $\mu$m and a spacing between plates of between about 2.0 $\mu$m and 2.75 $\mu$m with the flexible arms between about 18 and 30 $\mu$m long and about 2 $\mu$m wide and about 1.5 $\mu$m thick. The deflection is essentially controlled by support posts 20A and 20B and the flexible arms 22A and 22B and is chosen to permit an adequate lever rotation angle for a given separation change between the two plates, without requiring an excessively high voltage to move the top plate sufficiently to provide the necessary lever arm rotation angle. It can be appreciated that the bending is essentially frictionless. Moreover the action involved is essentially mechanical and should be reliable.

The surface of shutter 14 that is to reflect the incident optical signal, when positioned to do so, advantageously is coated with a chromium-gold layer to provide a mirror surface.

The adjacent ends of the two fibers 12A, 12B that define the gap 13 advantageously were right-angle cleaved and coated with anti-reflective (AR) coatings to maximize the efficiency of transmission in the desired direction in either position of the switch. Additionally to maximize reflecting efficiency, the shutter is designed to have its reflecting surface parallel to the adjacent ends of the fibers, when in the gap.

The forward insertion loss in the switch can be very low if the gap between the two fiber ends is narrow, as can be the case. Additionally, the backward or reflective insertion loss can be similarly quite low, if the shutter is made highly reflective.

The reflected wave is extracted in known fashion by the inclusion in the input path to the switch of an optical circulator that shunts the reflected wave into a selected new path while passing the forward wave into the switch. In FIG. 3, there is shown a switch 30 of the kind described included in a section of a transmission system. An input signal is first passed through a threeport optical circulator 31 before it enters the input fiber of the optical switch. As seen, an input signal is applied to the first port 32 of the optical circulator and exits at the second port 33 of the circulator and enters the input fiber of the switch 10 for travel therethrough when the switch is closed by the control. However, when the switch 10 is opened, the signal is reflected back by the switch into the second port 33 of the circulator to exit at third port 34 for travel in a new transmission path.

In another embodiment, in the place of a circulator a directional coupler can be provided adjacent the source fiber to intercept the reflected backward traveling wave for travel in a new path.

Alternatively, the invention can be used to form an off/on switch in which case the shutter is designed either to absorb or scatter the incident radiation and minimize the light reflected back into the source fiber. In one embodiment, the shutter is positioned at an angle with respect to the waveguide faces that advantageously is larger than the waveguide light acceptance angle so that essentially no reflected light couples back into the input or source waveguide.

In FIG. 5 there is shown an alternative embodiment of the inventions that is useful to divert light from a source waveguide, such as the fiber 41 into either of two output waveguides, such as the fibers 43 and 44 by the action of shutter 45 that is controlled by an actuator of the kind that has been described. It can be seen that when the shutter is outside the gaps formed by the fibers, light emitted from source fiber 40 will enter only the coaxially aligned fiber 43. However, if the shutter is interposed in the gap, and if the fiber is made to be highly reflective of incident light and properly interposed in the gap to be at an appropriate angle to the light emitted from the source fiber, the reflected light will enter the fiber 44 that is aligned to collect the reflected light. In the arrangement depicted fiber 45 is aligned to be at right angles with the direction of light emitted by the source fiber 41 in which case the shutter 45 should be interposed to form a 45° angle with the direction of the emitted light. In order to minimize the insertion loss for this arrangement with a comparably larger gap, waveguides with small acceptance angles producing low divergence light beams, such as expanded mode fibers, may be used. It can be appreciated that other orientations should be feasible.

It can also be appreciated that until the shutter is interposed sufficiently into the gap between the fibers to intercept all of the emitted light, the emitted light will be divided between the two output fibers.

It is also to be understood that there may be varied the details of the MEMS switch. In particular, as an alternative to the use of a flexure section between the lever arm and the moved plates, forms of hinges may be provided.

It is to be understood that the exemplary embodiment described is merely illustrative of the general principles of the invention. In particular, various modifications should be feasible without departing from the spirit and scope of the invention. In particular, the particular materials mentioned may be changed as can be the dimensions and shape of the various sections without departing from the spirit and scope of the invention.

Moreover, it should be apparent that because of the small sizes and low power requirements, the similarity of materials and fabrication techniques required that resemble those involved in the manufacture of integrated circuits, a plurality of optical switches of the kind described can be combined in an analogous monolithic structure.

What is claimed:

1. An optical switch comprising:

a source optical waveguide and an output optical waveguide aligned end-to-end and having adjacent ends spaced apart to define a gap therebetween;

and a MEMS device including an actuator formed by a pair of spaced plates, the first of the two plates fixed and the second suspended over the first plate to be moved by a voltage applied between the two plates, a lever arm that at one end is flexibly coupled to the second plate and at the other end supports a shutter whose position in or out of the gap is determined by the voltage between the two plates, the shutter when in the gap reflecting an incident optical signal from the source fiber back into the source fiber; and hinge means that connect the lever arm to the movable plate of the pair of spaced plates whereby movement of the movable plate deflects the lever arm to control the shutter position in the gap relative to the waveguides.

2. An optical switch in accordance with claim 1 in which the shutter includes a reflective coating on the surface to be exposed to an incident optical signal.

3. An optical switch in accordance with claim 1 in which the optical waveguides are optical fibers.

4. An optical switch in accordance with claim 3 in which the adjacent ends of the optical fibers are each cleaved at right angles.

5. An optical switch in accordance with claim 4 in which the shutter has a reflecting surface facing the source fiber that is parallel to the cleaved end surfaces of the fibers when inserted in the gap.

6. An optical switch comprising a pair of optical waveguides aligned end-to-end with a gap therebetween and a MEMS device for inserting controllably a reflective shutter in the gap; said MEMS device including an actuator having a pair of parallel plates that are spaced apart and of which one is rigid and the other movable by a voltage applied between the plates;

a shutter including a reflecting surface;

a lever of which one end supports the shutter and the other end is coupled to the movable plate for interposing the shutter in the gap under control of a voltage applied to the actuator; and means for coupling the movable plate to said other end of the lever comprising a pair of support posts, a pair of flexible extension arms that extend between the support posts and an end of the movable plate, and a brace portion that extends between the two extension arms and to which is connected said other end of the lever arm.

7. An optical switch in accordance with claim 6 in which the movable plate of the actuator, the lever, the flexible extension arms and the brace portion are each part of a integral polysilicon layer.

8. An optical switch in accordance with claim 7 in which the waveguides are optical fibers and each of the two fiber ends that define the gap has been cleaved at right angles to the fiber and includes an antireflection coating.

9. An optical switch in accordance with claim 8 in which the shutter when disposed in the gap reflects incident optical energy coming from an input fiber back into the input fiber.

10. In combination, an optical switch in accordance with claim 6 and a circulator, the circulator having a first input port, a second port that is coupled to the free end of the input waveguide, and a third output port.

11. An optical switch that includes a source waveguide and an output waveguide aligned end to end for defining a gap between a pair of adjacent ends; a MEMS device comprising a shutter that is movable in and out of the gap under control of an applied voltage, a pair of spaced apart plates including a movable plate, the shutter being integral with a lever arm, the lever arm being integral with a flexible section, the flexible section including a pair of flexible arms that are integral with the movable plate of the pair of spaced plates, the upper plate, the flexible arms, and the lever, the assembly being supported by posts extending between the movable plate and a substrate; and means for applying a control voltage between the pair of spaced plates for controlling the separation of the spaced plates and the position of the shutter with respect to the gap.

12. An optical switch in accordance with claim 11 in which the waveguides are optical fibers.

13. An optical switch in accordance with claim 12 in which the optical fiber ends that define the gap are right angle cleaved and coated to be anti-reflective.

14. An optical switch including a source waveguide and a first and second output waveguides, one end of the source waveguide being spaced apart by a gap with one end of each of the first and second output waveguides, and a MEMs device including an actuator formed by a pair of spaced plates, the first of the two plates fixed and the second suspended over the first plate to be moved by a voltage applied between the two plates, a lever arm that at one end is flexibly coupled to the second plate and at the other end supports a shutter whose position in or out of the gaps is determined by the voltage between the two plates, the alignment of the waveguides and the nature of the shutter being such that the division of light exiting from the source waveguide and entering the output fibers is determined by the position of the shutter in the gap.

15. An optical switch in accordance with claim 14 in which the waveguides are optical fibers and the fibers are disposed so that when the shutter is outside the gap essentially all of the light exiting the source fiber enters the first output fiber and when the shutter is in the gap essentially all of the light exiting the source fiber enters the second output fiber.

16. A device for use as an actuator in an optical switch comprising:

a pair of spaced apart plates, the first of the pair being fixed on a substrate and the second suspended over the first such that the space between the two can be varied by a voltage applied between the two, a shutter connected to the moveable plate by way of a lever and a flexure section, the flexure section comprising a pair of flexible arms interconnected by a brace, the lever being connected to the brace, and one end of each flexible arm being connected to the moveable plate and the other end of each flexible arm being connected to a separate support post that is fixed to the substrate.

17. A device in accordance with claim 16 in that the plates, the flexible arms, the brace and the lever are of polysilicon that has been patterned by photolithography and shaped by micromachining.

* * * * *